US006749389B1

(12) United States Patent  
Vlaanderen

(10) Patent No.: US 6,749,389 B1  
(45) Date of Patent: Jun. 15, 2004

(54) LINKAGE FOR ON-OFF LOADING AND DUMPING OF A DUMPSTER ON A TRUCK FRAME

(75) Inventor: James Vlaanderen, Kremme, IA (US)

(73) Assignee: Stellar Industries, Inc., Garner, IA (US)

( * ) Notice: Subject to any disclaimer, the term of this patent is extended or adjusted under 35 U.S.C. 154(b) by 0 days.

(21) Appl. No.: 10/354,411

(22) Filed: Jan. 30, 2003

(51) Int. Cl.[7] .................................................. B60P 1/64

(52) U.S. Cl. ....................................... 414/491; 414/498

(58) Field of Search ................................. 414/491, 498

(56) References Cited

U.S. PATENT DOCUMENTS 5,108,247 A     4/1992  Vlaanderen ................. 414/421
2001/0038218 A1 * 11/2001  Clare et al. ................. 296/37.6

* cited by examiner

Primary Examiner—Steven A. Bratlie  
(74) Attorney, Agent, or Firm—Wood, Phillips, Katz, Clark & Mortimer

(57) ABSTRACT

Damage to a linkage in a truck loading mechanism including a tilt link, a secondary link and a dump link is avoided by providing interlocking tabs where one of the tabs is slidably and pivotally mounted to the dump link and normally held in an operative position by means of a frangible element that breaks before damage can occur when excessive forces exist between the links.

14 Claims, 2 Drawing Sheets

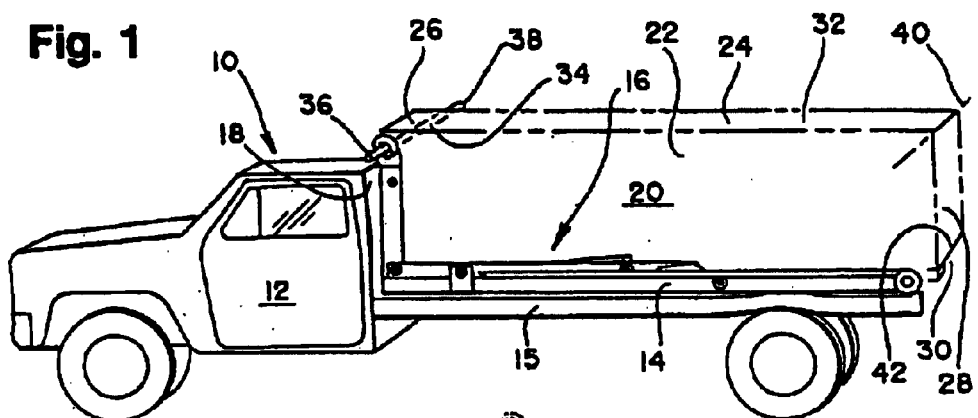
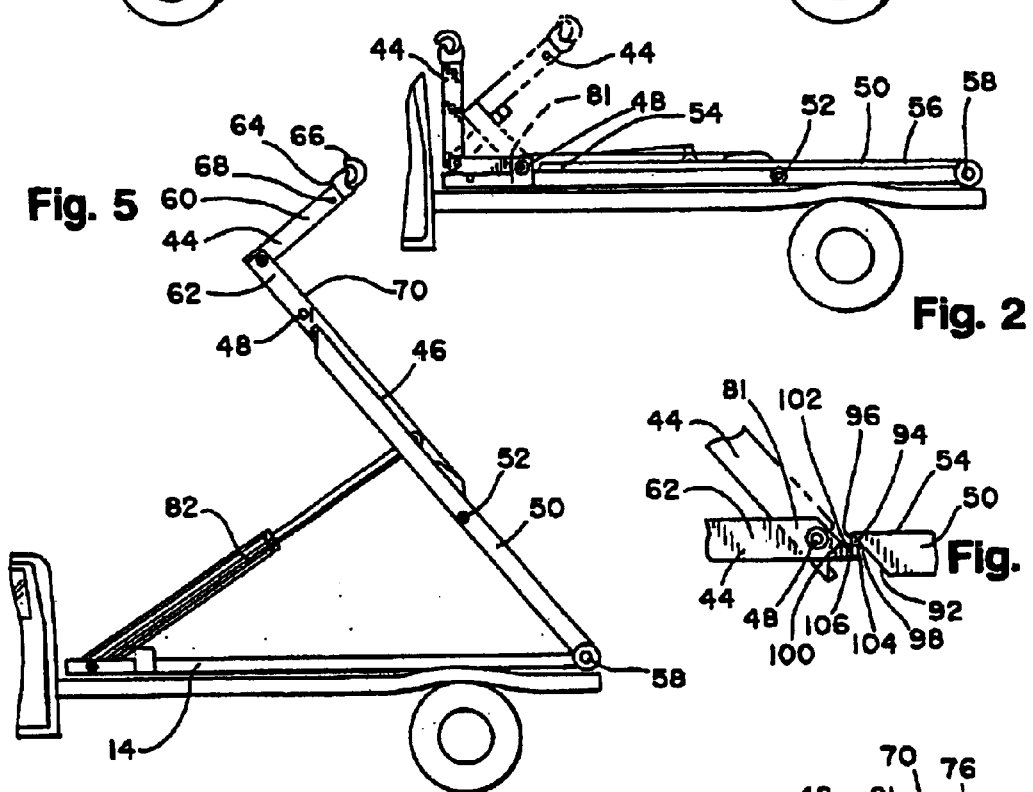
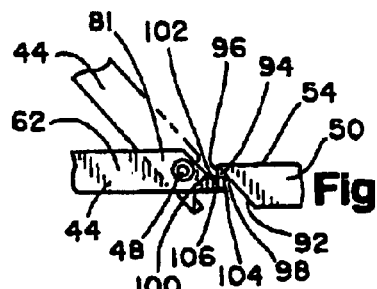
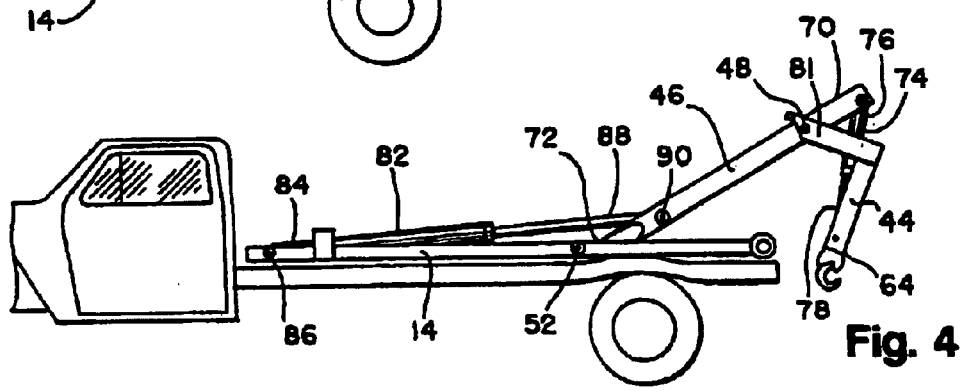

LINKAGE FOR ON-OFF LOADING AND DUMPING OF A DUMPSTER ON A TRUCK FRAME

FIELD OF THE INVENTION

This invention relates to on-off loading and dumping linkages for load receiving bodies carried on a truck frame.

BACKGROUND OF THE INVENTION

U.S. Pat. No. 5,108,247, issued Apr. 28, 1992, entitled "Loading Linkage" and assigned to the same assignee as the instant application, the entire disclosure of which is herein incorporated by reference, discloses a loading linkage that is multi-functional and which is intended to be mounted on the frame of a dumpster hauling truck. The linkage provides for on loading or off loading the dumpster to the truck frame as well as a dumping mode wherein the contents of the dumpster may be dumped while still attached to the truck. This linkage has been in commercial use for a goodly number of years and has been very successful in the applications for which it is intended. The linkage includes a secondary link and a tilt link pivoted to the frame and which extend under and up the front of a dumpster on the truck. A dump link is also provided and extends under the dumpster and is pivoted to the rear of the truck frame. A first power cylinder pivotally engages the secondary link for tilting the secondary link relative to the truck frame and a second power cylinder is provided for pivoting the tilt link relative to the secondary link.

The tilt link, adjacent the dump link, has a locking tab that underlies a similar tab on the dump link in one position so as to lock all of the links for movement in unison under power from the first cylinder to effectuate a dumping mode. In addition, the tilt link may be tilted relative to the secondary link under the power of the second power cylinder to remove the tab from a position underlying the dump link to disconnect the dump link from the remaining links, thus allowing movement of the tilt and secondary links without movement of the dump link under power from the first cylinder to effectuate the on-off loading mode.

Typically, the tilt link has a hook at its end remote from the secondary link which is engageable with a grab bar mounted on the front wall of the dumpster. The hook, when engaged with the grab bar, provides the necessary engagement with the dumpster to provide on-off loading of the dumpster on the truck as well as to hold the dumpster in place during the dumping mode.

Proper operation of the linkage requires that when on loading a dumpster, the operator should totally retract the first power cylinder before retracting the second power cylinder. If this order of operation is not followed and the second power cylinder is retracted before the first power cylinder, the tilt tab and dump tab at the interface of the tilt link and the dump link may not properly align with the tab on the tilt link coming down on top of the tab on the dump link, rather than underlying the same as is intended. The result may cause damage to the tilt or secondary links.

The present invention is directed to obviating the possibility of such damage when linkage is improperly operated.

SUMMARY OF THE INVENTION

It is the principal object of the invention to provide an improved multi-function linkage for use on a truck that may be operated in an on-off loading mode for loading or unloading a dumpster on the truck and which may additionally be operated in a dumping mode for dumping the contents of a dumpster while the dumpster is secured to the truck. More specifically, it is an object of the invention to provide such a linkage wherein the possibility of damage to one or more links of the system is obviated even when the linkage is improperly operated.

In one exemplary embodiment, the invention contemplates a truck frame of a dumpster hauling truck that provides on-off loading and dumping modes which includes a dump link pivoted to the truck frame, a secondary link pivoted to the dump link and a tilt link pivoted to the secondary link to extend under and up the front of a dumpster. A first extendable dump motor is provided for pivoting the secondary link relative to the truck frame and a second extendable motor is provided for pivoting the tilt link relative to the secondary link. Interengageable tabs, one on the tilt link and one on the dump link, are provided to connect all of the links for movement in unison under power from the first extendable motor to effectuate the dumping mode. The invention contemplates the improvement wherein one of the tabs is pivotally and slidably mounted to one of the tilt and dump links and further includes an element normally connecting the one tab to one of the tilt and dump links to normally hold the one tab against the pivotal and slidable movement when the one tab is subjected to excessive force.

In a preferred embodiment, the connecting element is a frangible element.

In a preferred embodiment, the frangible element is a breakaway bolt connecting the one tab to the one of the secondary and dump links.

A preferred embodiment contemplates the provision of a pivot pin connecting the one tab to the one of the tilt and dump links and that the frangible bolt be spaced from the pivot pin.

In a highly preferred embodiment, the one tab, at a location remote from the other tab, includes an elongated opening of greater size than the pivot pin and the pivot pin extends through the elongated opening.

Even more preferably, the elongated opening is defined by a tube fixed to the one tab at the aforementioned location.

In a highly preferred embodiment, the tube is of generally rectangular cross section and even more preferably, the one tab is mounted to the dump link.

Other objects and advantages will become apparent from the following specification taken in connection with the accompanying drawings.

BRIEF DESCRIPTION OF THE DRAWINGS

FIG. 1 is a perspective view of a dumpster hauling truck having a loading linkage embodying the features of the present invention;

FIG. 2 is a fragmentary side elevation of the truck shown in FIG. 1 with a tilt link in dotted lines rotated to an on-off loading mode;

FIG. 3 is an enlarged, fragmentary view of the locking portions on the tilt link and a dump link of the loading linkage shown in FIG. 1;

FIG. 4 is a fragmentary side elevation of the truck with the tilt link and a secondary link rotated in an on-off loading mode;

FIG. 5 is a fragmentary side elevation of the truck with the tilt link and the secondary link and the dump link rotated in unison in a dumping mode;

DETAILED DESCRIPTION OF THE PREFERRED EMBODIMENT

Figure 6:
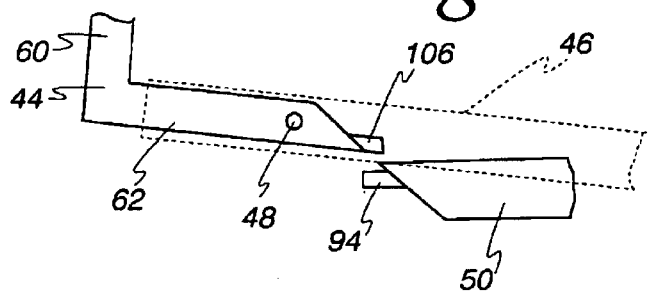
FIG. 6 is a fragmentary view of the locking portions on the tilt link and the dump link of the loading linkage showing the relative position of the locking components where the second power cylinder has been fully retracted before full retraction of the first power cylinder employed with the linkage.

FIG. 1 illustrates a truck generally at 10 having a forward portion or cab 12 and a rearwardly extending bed or frame 14 supported on frame rails 15, only one of which is shown. A linkage embodying the features of the present invention is shown generally at 16 and is supported on the frame 14 and in proximity to a rear face 18 of the cab 12 to carry a rectangular dumpster or load receiving body shown in phantom lines at 20. The dumpster 20 has a pair of laterally spaced sidewalls 22 and 24 extending between opposite end walls 26 and 28. A bottom wall 30 is supported on the linkage 16 and is opposite an open top 32. A grab bar 34 is mounted on the front wall 26 of dumpster 20 and has a pair of oppositely spaced laterally extending ends 36 and 38 which may be engaged with the linkage 16.

The rear wall 28, in one mode, is defined by a pivoting door having a hinge shown schematically at 40 and a locking pin shown schematically at 42 for securing the door.

It should be understood that while a single linkage 16 is illustrated in the views of FIGS. 1 and 2 for simplicity, the present invention comprehends an apparatus having a pair of identical linkages laterally spaced on the truck frame 14 and each associated with one of the longitudinally extending frame rails 15 typically mounted on the underside of a truck frame for supporting a load thereon. With that understanding, the following discussion will describe the single linkage illustrated in FIG. 1 only.

The linkage 16 includes an L-shaped tilt link 44 pivotally connected to a secondary link 46 near one end thereof by a pivot pin 48. A dump link 50 has one end pivotally connected to the secondary link 46 oppositely of the tilt link 44 by a pivot pin 52. As illustrated in FIG. 2, the dump link 50 extends from a first end 54 adjacent the tilt link 44 along the frame 14 to the rear of the truck to an opposite end 56 which is mounted to the frame 14 with a pivot connection 58.

The tilt link 44 has mutually perpendicular legs 60 and 62. The leg 60 has an outer end 64 terminating in a hook 66 which is rigidly attached to the leg 60 at a pin 68. The hook 66 is engageable with a respective one of the ends 36, 38 of the grab bar 34. The leg 62 is pivoted to the secondary link 46 by the pivot pin 48.

The secondary link 46 is an elongate rigid member having opposed ends 70 and 72. The end 72 includes the pivot 52 which joins the secondary link 46 with the dump link 50 intermediate the ends of the latter. An extendible hydraulic tilt cylinder 74 has its cylinder end 76 pivotally connected to the end 70 of the secondary link 46 and its rod end 78 pivotally connected to the outer end 64 of the tilt link 44 by the pin 68. Thus, the hydraulic cylinder 74 is operable to rotate the tilt link 44 relative to the secondary link 46 between the solid and dotted line positions shown in FIG. 2.

The dump link 50 extends from the pivot 58 at the rear most end 80 of the frame 14 forwardly to its end 54 which is in close proximity to the end 81 of the leg 62 of the tilt link 44.

A hydraulic main power cylinder 82 has its cylinder end 84 pivotally connected by means of a pivot 86 to the frame 14 oppositely of the pivot 58. The rod end 88 of the cylinder 82 is connected at an opposite end 88 by means of pivot 90 to the secondary link 46 intermediate its ends 70 and 72.

As best shown in the enlarged view of FIG. 3, the end 54 of the dump link 50 has a section 92 from which a dump tab 94 having perpendicular surfaces 96 and 98 extends. The leg 62 has a complementary arrangement with an angled section 100 and perpendicular faces 102 and 104 on a tilt tab 106 which extends into underlying relation with the tab 94. Thus, the surface 98 on the tab 94 of the dump link 50 and the surface 104 of the tab 106 on the leg 62 of the tilt link 44 serve as stops and may engage to limit clockwise rotation of the secondary link 46 relative to the dump link about the pivot pin 52 when so engaged. However, when the tilt link 44 is rotated in a clockwise direction relative to both the dump link 50 and the secondary link 46 as seen in FIG. 3, the tabs 94 and 106 disengage. When this occurs, the cylinder 82 may be operated to pivot the secondary link 46 on the dump link 50 without moving the latter on the frame 14.

In one mode of operation, the linkage 16 is adapted for providing on and off loading of a typically constructed refuse receiving dumpster 20.

Prior to entering the on-off loading mode, each of the links 44, 46 and 50 will typically be positioned as shown in solid lines in FIG. 2 such that the linkage forms a generally L-shaped structure extending along the length of the frame 14 and up the rear face 18 of the cab 12. Each of the hydraulic cylinders 74 and 82 initially will be in a retracted position. The tilt cylinder 74 is then extended by any suitable control (not shown) to move the tilt link 44 relative to secondary link 46 and the dump link 50 to the dotted line position shown in FIGS. 2 and 3. This rotation results in disengagement of the tab 106 on the tilt link 44 and the tab 94 on the dump link 50. The main cylinder 82 is then actuated and operates to rotate the secondary link 46 about the pivot 52 as shown in FIG. 4. Because the tilt link 44 and the dump link 50 are disengaged, the tilt link 44 will move with the secondary link 46 while the dump link 50 will remain stationary on the frame 14. The power cylinder 82 is continuously extended to rotate the secondary link 46 and tilt link 44 into position for engaging and hooking the grab bar 34 of a dumpster 24 positioned on the ground or depositing a dumpster. For on loading, once the hook 66 is aligned with the grab bar 34, the power cylinder 82 is retracted to rotate the secondary link 46 in a counter clockwise direction as viewed in FIG. 5 to fully engage the hook 66 with the dumpster 20. Continued rotation of the secondary link 46 results in the raising of dumpster 20 onto the truck 10. Once the secondary link 46 is rotated back into its initial position, the power cylinder 74 is retracted to rotate tilt link 44 about pivot 48 to pull the dumpster forward on the linkage 16 to the position shown in FIG. 1 to be ready for transport. Rollers (not shown) may be conventionally employed to allow ready movement of the dumpster 20 on the truck 10.

To off load the dumpster 20, the above process is simply reversed.

In the dumping mode of operation, the links 44, 46 and 50 are rotated in unison as a rigid structure under power from the power cylinder 82 to elevate a dumpster 20 carried on the frame 14 to an angle sufficient to permit the discharge of material carried within the body through the end wall/door 28 under the force of gravity.

In this mode, the dumpster 20 is elevated and tilted with the linkage 16 in the following manner. With the links 44,46 and 50 in the configuration shown in FIG. 1 with the tabs 94 and 106 of the tilt link 44 and the dump link 50 engaged, the power cylinder 82 is actuated by any suitable control (not shown). At the same time, the cylinder 74 is locked in its retracted position as by a conventional hydraulic lock in its actuating circuit. As the power cylinder 82 is extended, the rod end 88 exerts an elevating force against the secondary link 46. Due to the pivotal connection 48 between the tilt link 44 and the secondary link 46, and the cylinder 74 being locked in a retracted configuration, the tabs 94 and 106 are engaged to transmit the elevating force to the dump link 50. As a result, the links 44, 46 and 50 move in unison about the pivot 58 on the rear of the truck frame to the position shown in FIG. 5.

Once the linkage 16 is raised to an angle sufficient to allow the gravity-induced discharge of materials contained within the dumpster 20, or prior thereto as desired, the lock pin 42 is withdrawn to permit the rotation of the end wall/door 28 about the hinge axis 40 to permit the egress of material therethrough. Thereafter, the cylinder 82 may be retracted to lower the linkage to the transport position shown in solid lines in FIG. 2.

Turning now to FIG. 6, the problem that can occur will be more greatly appreciated with reference thereto. FIG. 6 fragmentarily illustrates the situation where the tilt cylinder 74 (not shown in FIG. 6) has been fully retracted so that the leg 62 of the tilt link 44 is parallel to the secondary link 46. In this situation, the main cylinder 82 (also not shown in FIG. 6) is not fully retracted with the result that the secondary link 46 will be angled somewhat upwardly with respect to the dump link 50. In this case, the tilt tab 106 overlies the dump tab 94. Further retraction of the tilt cylinder 82 will cause the tilt tab 106 to descend and engage the upper surface of the tilt tab 94 before the main cylinder 82 has reached its fully retracted position. As a consequence, continued application of hydraulic pressure to the tilt cylinder 82 will cause an excessive force to be applied to the tabs 94, 106 and such can result in damage to the tilt link 44 and/or the secondary link 46, and possibly the dump link 50 as well.

Figure 7:
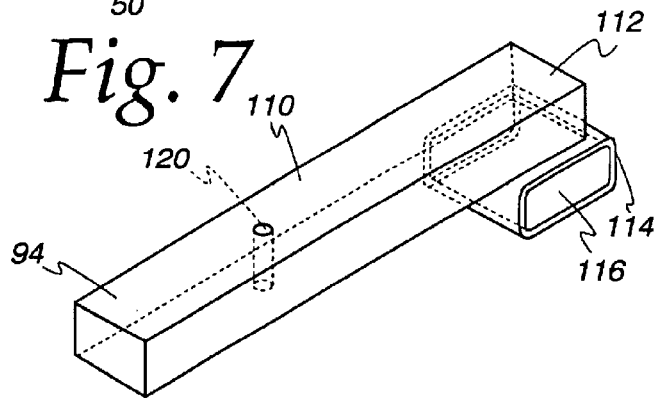
FIG. 7 is a perspective view of a breakaway tab construction employed in the improvement of the present invention.
Figure 8:
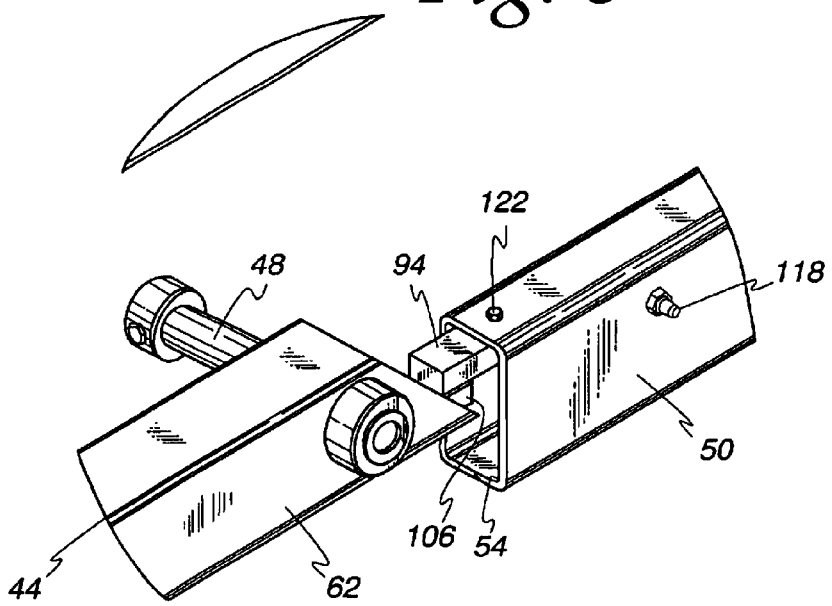
FIG. 8 is a perspective view of the proper positioning of the locking components.

To avoid this problem, the structure of FIGS. 7 and 8 is incorporate at the interface of the tilt link 44 and the dump link 50.

Referring to FIG. 7, the tab 94 is formed by one end of an elongated metal bar 110. At its end 112 opposite the tab end 94, the bar 110 has a rectangular tube 114 secured thereto as by welding so that the interior 116 of the tube 114 is a right angle to the bar 110. The interior 116 of the tube 114 defines an elongated opening of greater size than a pivot pin formed of a bolt 118 that passes through the dump link 50, which in this case is also formed of a metal tube, at a location spaced somewhat from the end 54 of the dump link. As shown in FIG. 8, the end 54 need not be angled as shown at 92 in FIGS. 3–5, inclusive but may be straight if desired.

In any event, it will be appreciated that by reason of the elongated interior 116 of the tube 114, and the fact that the pivot pin 118 extends through the same, the tab 94 is pivoted to the dump link 50. In addition, because the tube 114 is rectangular, having its long dimension extending parallel to the bar 110, the dump tab 94 is also slidably mounted to the dump link 50 for movement in and out of the dump link 50 as desired.

At a location spaced from the tube 114, and thus from the pivot pin 118, a bore 120 (FIG. 7) is located in the bar 110. A bore (not shown) also extends through the upper surface of the dump link 50 and a frangible element in the form of breakaway bolt 122 extends through the two to normally hold the bar 110 against the upper inner surface of the tube forming the dump link 50. A nut (not shown) is employed to retain the bolt 122 in this position. The strength of the bolt 122 is selected so that the same will fracture and break upon the application of an excessive downward force or an excessive sideward force, or a combination of both forces is applied to the tab 94. When the bolt 122 fractures, because of the use of the tube 114 and the elongated opening provided therein together with the pivot pin 118, the tab 94 is free to move inwardly or downwardly, or both within the dump link 50. As can be appreciated from FIG. 6, such movement will allow the dump tab 94 to move out of the path of the tilt tab 106 and permit full retraction of the tilt cylinder 74 without causing damage to any of the components other than breaking the bolt 122, which is easily replaced.

In normal operation, where the main cylinder 82 is fully retracted before retraction of the tilt cylinder 74, the tab 106 is free to pass under the tab 94 as can be appreciated from FIG. 3. Thus, so long as the linkage is operated properly, the breakaway bolt 122 will hold the dump tab 94 in the proper position.

Should improper operation occur and result in the fracturing of the bolt 122, is it only necessary to remove the fragments of the bolt 122 and replace the same with another breakaway bolt after realigning the parts to their proper position. At this point, the tilt tab 106 will underlie the dump tab 94 and the entire linkage, whether employed for on-off loading or for dumping, will operate in the manner previously described. Thus, damage that could be expensive to repair is easily avoided through the use of an inexpensive breakaway bolt 122, which is readily replaced when fractured.

While the invention has been described in terms of pivotally and slidably mounting the tab 94 on the dump link 50, it will be appreciated that the same sort of mechanism could be utilized in mounting the tilt tab 106 to the tilt link 44 provided spacial difficulties do not arise. In the embodiment illustrated, the pivot 48 between the tilt link 44 and the secondary link 46 may hinder such placement but those skilled in the art will readily appreciate that any spatial constraints provided by the presence of the pivot 48 can be avoided simply by repositioning the pivot 48.

It will also be appreciated that means other than a frangible element such as the bolt 122 could be employed to normally hold the pivotally and slidably mounted one of the tabs 94,106 in the desired normal position. For example, heavy springs could be utilized for the same purposes. Other equivalent devices could be employed as well. However, the use of a frangible element such as the bolt 122 is preferred because of the simplicity, and thus minimal expense, of the system.

What is claimed is:

1. In a truck frame of a dumpster hauling truck providing on-off loading and dumping modes and including a dump link pivoted to the truck frame, a secondary link pivoted to the dump link, a tilt link pivoted to the secondary link to extend under and up the front of a dumpster, a first extendable dump motor for tilting the secondary link relative to the truck frame, a second extendable motor for pivoting the tilt link relative to the secondary link, and interengageable tabs, one on the tilt link and one on the dump link, to connect all said links for movement in unison under power from the first extendable motor to effectuate the dumping mode, the improvement wherein one of said tabs is pivotally and slidably mounted to one of said tilt and dump links and further including an element normally connecting said one tab to said one of said tilt and dump links to normally hold said one tab against said pivotal and slidable movement while allowing said pivotal and slidable movement when said one tab is subjected to an excess force.

2. The truck frame of claim 1 wherein said element is a frangible element.

3. The truck frame of claim 2 wherein said frangible element is a break away bolt connecting said one tab to said one of said tilt and dump links.

4. The truck frame of claim 3 including a pivot pin connecting said one tab to said one of said tilt and dump links and said bolt is spaced from said pivot pin.

5. The truck frame of claim 4 wherein said one tab, at a location remote from the other tab includes an elongated opening of greater size than said pivot pin and said pivot pin extends through said elongated opening.

6. The truck frame of claim 5 wherein said elongated opening is defined by a tube fixed to said one tab at said location.

7. The truck frame of claim 6 wherein said tube is of generally rectangular cross section.

8. The truck frame of claim 7 wherein said one tab is mounted to said dump link.

9. The truck frame of claim 1 wherein said one tab is mounted to said dump link.

10. In a multi-function linkage in a truck frame for providing on-off loading and dumping of a load-receiving body carried on the truck frame, comprising:

a dump link under the load receiving body and pivoted on the truck frame;

a pair of interconnected links extending about the load receiving body and pivoted to the dump link;

a first actuator for tilting the interconnected links and the dump link relative to the truck frame and for alternatively tilting only the interconnected links relative to the truck frame;

a second actuator for rotating the interconnected links relative to each other; and engagement means on the dump link for engaging the interconnected links and connecting all of the links for movement in unison under power from the first actuator in the dumping mode and comprising an end part of the dump link which overlaps a complementary end part of one of the interconnected links, whereby upon rotation of the interconnected links relative to each other under power from the second actuator, the interconnected links are movable relative to the dump link and whereby the interconnected links are movable in unison with the dump link under power from the first actuator, the improvement wherein one of said end parts is connected to its associated link by a replaceable, frangible connection.

11. In a truck frame for a dumpster hauling truck, the combination:

a dump link pivoted at one end to said frame;

an L-shaped tilt link;

a secondary link;

a first pivot connecting said tilt link and said secondary link;

a hydraulic tilt cylinder extending between said tilt link and said secondary link for effecting pivotal movement therebetween;

a second pivot remote from said first pivot and intermediate the ends of said dump link pivotally connecting said secondary link and said dump link; and a hydraulic main cylinder extending between said frame and said secondary link;

adjacent sections of said tilt link and said dump link being in interference relation for at least one position of movement of said tilt link to lock said tilt link, said secondary link and said dump link together for movement in unison to provide a dumping mode of operation;

said tilt cylinder being operable to move said tilt link from said at least one position to another position whereat said adjacent sections are not in interference relation thereby freeing said tilt link and said secondary link for pivotal movement relative to said dump link to provide an on-off loading mode of operation;

the improvement wherein one of said adjacent sections of said tilt link and said dump link is movable from said interference relation for another position of movement of said tilt link.

12. The truck frame of claim 11 wherein said one adjacent section is mounted to its associated link by a pivotal and sliding connection and is normally held in a position to be in said interference relation by a yieldable element.

13. The truck frame of claim 12 wherein said yieldable element is a frangible element.

14. The truck frame of claim 13 wherein said frangible element is breakaway bolt.

* * * * *